US007418888B2

(12) United States Patent
Vialle

(10) Patent No.: US 7,418,888 B2
(45) Date of Patent: Sep. 2, 2008

(54) TRANSMISSION MECHANISM BETWEEN ACCESSORIES AND ENGINE MEMBERS FOR DRIVING THE ROTOR OF A ROTORCRAFT

(75) Inventor: Michel Vialle, Aix En Provence (FR)

(73) Assignee: Eurocopter, Marignane Cedex (FR)

( * ) Notice: Subject to any disclaimer, the term of this patent is extended or adjusted under 35 U.S.C. 154(b) by 637 days.

(21) Appl. No.: 11/145,928

(22) Filed: Jun. 7, 2005

(65) Prior Publication Data
US 2006/0000300 A1 Jan. 5, 2006

(30) Foreign Application Priority Data
Jun. 7, 2004 (FR) .................................. 04 06131

(51) Int. Cl.
*F16H 37/06* (2006.01)
*B64C 27/00* (2006.01)
(52) U.S. Cl. ................. 74/665 N; 74/665 L; 244/15.25
(58) Field of Classification Search ................ 74/665 L, 74/665 M, 665 N; 244/17.11, 17.25, 17.27
See application file for complete search history.

(56) References Cited
U.S. PATENT DOCUMENTS 3,255,825 A * 6/1966 Mouille et al. .......... 416/170 R
4,659,286 A 4/1987 Garavaglia et al.
4,783,023 A * 11/1988 Jupe .............................. 244/6
4,811,627 A * 3/1989 Mouille .................... 74/665 L
5,281,099 A * 1/1994 Hunter et al. ........... 416/244 R
5,572,910 A * 11/1996 Tomaselli et al. .......... 74/665 F
5,802,918 A * 9/1998 Chen et al. .................... 74/416
5,853,145 A * 12/1998 Carter, Jr. ................ 244/17.25
6,443,035 B1 * 9/2002 Scardullo .................. 74/665 H

OTHER PUBLICATIONS

AGARD Conference Proceedings No. 302 Helicopter Propulsion Systems.

* cited by examiner

*Primary Examiner*—Ha D. Ho
(74) *Attorney, Agent, or Firm*—Young & Thompson

(57) ABSTRACT

A transmission mechanism between at least one accessory and engine members for driving the rotor of a rotorcraft, the transmission therebetween being selectively either in isolation or in combination. An intermediate shaft is interposed between a main drive shaft for the rotor and a secondary drive shaft for the accessory, for driving the accessory from an engine member allocated to driving it. This intermediate shaft engages directly on the main shaft and meshes with an accessory drive gear via freewheels to enable the gear to be driven either by the engine member or from the main shaft in the position for combined drive together with the rotor, the rotor being driven by the other engine member or autorotation in the event of both engine members failing.

10 Claims, 2 Drawing Sheets

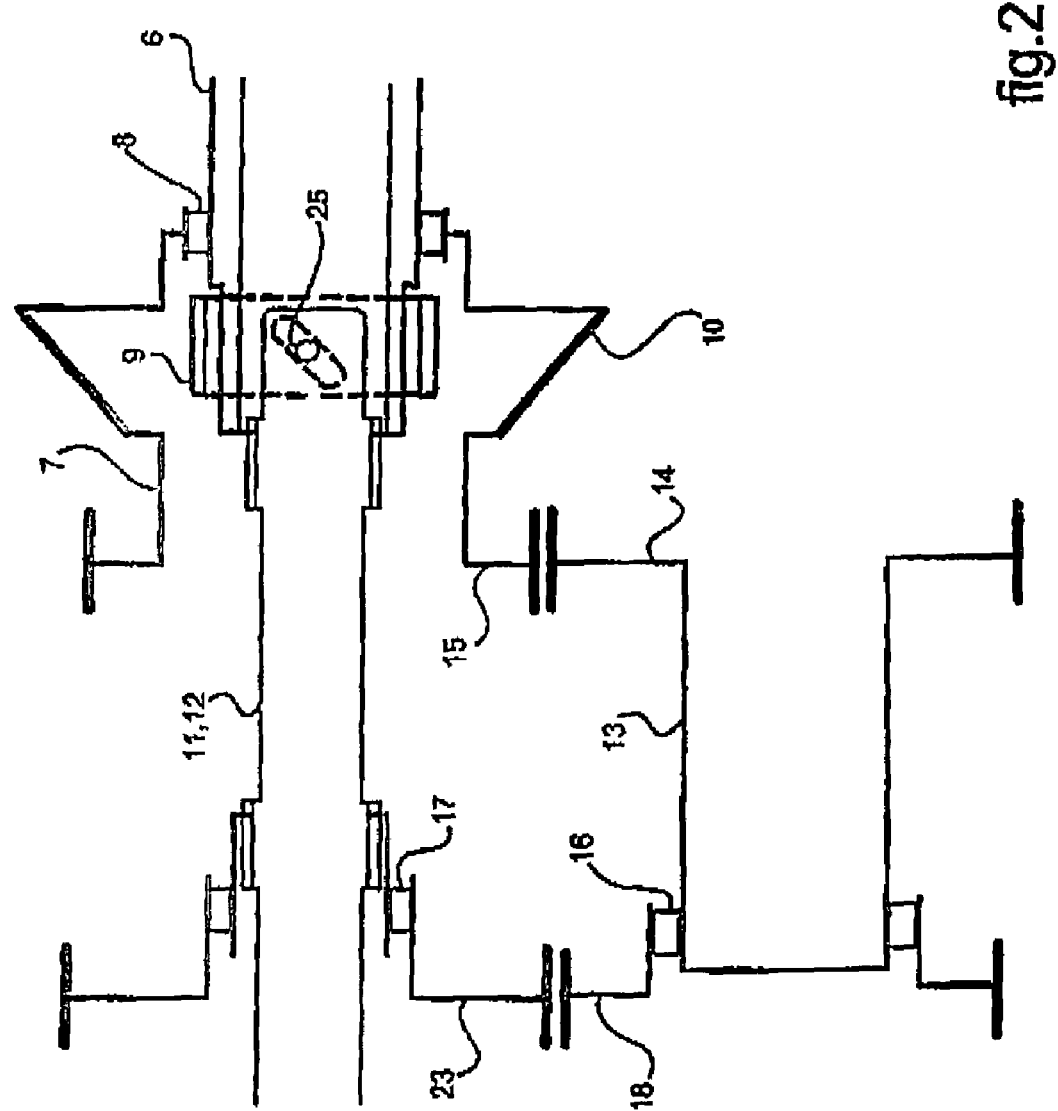

TRANSMISSION MECHANISM BETWEEN ACCESSORIES AND ENGINE MEMBERS FOR DRIVING THE ROTOR OF A ROTORCRAFT

The invention relates to the field of mechanical transmission, and more particularly to mechanisms for selectively putting a rotary shaft into communication with one drive source, or alternatively with a plurality of drive sources. The invention provides such a transmission mechanism for driving accessories such as an alternator and/or a compressor from engine members for driving a shaft, in particular a shaft for driving a rotor of a rotorcraft, with accessory drive being performed selectively, either in isolation or else in combination with drive of the rotor.

BACKGROUND OF THE INVENTION

It is recalled that in the field of rotorcraft, in particular helicopters or the like, it is common practice to drive the rotor by means of a plurality of engine members, in particular by means of a pair of engines. It is also recalled that at least one of the engine members is also used to drive accessories of the rotorcraft, such as an alternator or a compressor, for example. At this stage of the description, it should be observed that the number and the kind of such accessories are not limiting on the scope of the present invention.

A general problem posed lies in the dual purpose of the engine members of the rotorcraft, i.e. both driving the rotor, and for at least one of them, also driving the accessories. This problem is made particularly difficult to solve in that it is common practice to drive the accessories independently of the rotor while the rotorcraft is on the ground, either while preparing to take off or while waiting, in particular. To this end, it is common practice for one of the engine members to be allocated to driving the accessories, while the connection between the rotor and the set of engine members is interrupted.

More precisely, the engine member for driving the accessories is in communication firstly with a main drive shaft for the rotor via a selective drive member, such as a positive clutch mechanism or the like, and secondly it is in communication with a secondary shaft for driving the accessories. These dispositions are such that when the selective drive member is moved, the engine member for driving the accessories can either drive the accessories alone, or else it can drive both the accessories and also the rotor.

In particular during a stage while the rotorcraft is being prepared, prior to setting the rotor into rotation, the connection between the engine member for the accessories and the main shaft is interrupted, with only the accessories being driven by this engine member. Thereafter, once this preparation stage has come to an end, the connection between the engine member for driving the accessories and the rotor is established via the selective drive member. Likewise, during a waiting period for the rotorcraft during which drive to the rotor is temporarily interrupted, the selective drive member must be moved to break the connection between the main shaft and the engine allocated to driving the accessories, while nevertheless continuing to drive the accessories.

Patents FR 2 140 107 and U.S. Pat. No. 3,782,223 disclose a device comprising a large number of parts that turns out to be complex, bulky, and relatively fragile.

At this stage in the description, it should be observed that it is also common practice to interpose rotary differential mechanisms between the engine members and the associated main shafts for driving the rotor, where said rotary differential mechanisms may be constituted in particular by freewheels or the like. These freewheels are even more important when the rotor presents significant inertia, and they serve to ensure that no harm is done due to a relative speed difference between the rotor and one or other of the main shafts for driving it in association with the corresponding engine member. Nevertheless, it is common practice to operate the selective drive member (clutch) that is interposed between the main drive shaft of the rotor and the engine member for driving the accessories, by moving it in an axial direction, and that making such an axial movement is made difficult or even impossible beyond an acceptable threshold of rotary speed difference between the rotor and the engine member allocated to driving the accessories.

To overcome this difficulty, it is common on passing from the position for driving the accessories alone to the position for driving both the accessories and the rotor, to wait for said speed difference threshold to be reached prior to moving the selective drive member and causing the rotor to be driven from both engine members. Conversely, while the rotor is being driven by both engine members, the selective drive member is moved axially, and then only the engine member for driving the accessories is maintained in operation. Since moving the selective drive member is made difficult because of the difference in speed of rotation between the engine members, in particular on going from the position for driving the accessories alone to the position for driving the accessories together with the rotor, it is commonly accepted that drive to the accessories needs to be interrupted momentarily until a sufficiently close match has been achieved between the drive speeds of the various rotary members relative to one another.

In use, it has been found that such a general organization for the transmission mechanism is not fully satisfactory, in particular because of the risk of losing accessory function during the period of waiting for the speeds to match, as mentioned above, and/or in the event of any of the engines breaking down. Interrupting drive to the accessories, even if only momentarily, is harmful since the accessories might include in particular an air conditioner or an alternator for powering memory members, so interrupting the alternator can have the consequence of losing information. Nevertheless, in particular compared with the drawback of undesirable extra weight, the practice in this field tends to ignore this lack of satisfaction.

This practice is particularly accepted given that operating constraints for accessories, and in particular for the alternator, require them to be driven in compliance with minimum and maximum speed thresholds, thereby tending to make the transmission mechanism structure significantly more complex and making it inconceivable to achieve a structure that would enable those thresholds to be guaranteed while driving accessories under all circumstances.

OBJECT AND SUMMARY OF THE INVENTION

The object of the present invention is to propose a solution for maintaining drive to the accessories of a rotorcraft, including between the accessories being driven alone by a single engine member that is allocated thereto and/or being driven together with the rotor. This solution must nevertheless make it possible to continue with the usual operation of selectively driving the accessories by means of the engine members, and more particularly driving them selectively in isolation from the engine member allocated to the accessories, or together with both engine members for driving the rotor.

More precisely, the present invention seeks to make it possible to choose to drive the accessories selectively without being subjected to the constraint of needing to interrupt operation of the engine members for driving the rotor, with such freedom of action being possible without harming the reliability of the means used for driving either the rotor or the accessories, and with this being achieved with a structure that is as compact and lightweight as possible.

The present invention seeks more particularly to propose such a solution that takes account of the possibility of either of the engine members of the rotorcraft breaking down.

The mechanism of the present invention is a transmission mechanism between at least one accessory and the engine members for driving a general shaft, for driving the rotor in a rotorcraft, in particular. The transmission mechanism is of the same kind as those organized to enable accessories to be driven selectively in isolation by one of the engine members allocated to driving them, or by all of the engine members for driving the rotor, and in particular by a pair of engine members. More precisely, one of said engine members is allocated to driving the accessory in isolation or together with the rotor, while the other engine member is allocated at least to driving the rotor. The mechanism comprises a main shaft which is provided with a rotor drive member such as a conical gear, and which is associated with the drive shaft engaged on the engine member allocated to driving the accessory. This is achieved via a main rotary speed differential member, in particular a freewheel or the like, and an axially movable selective rotary drive member, such as a positive clutch in particular, or the like. This selective drive is implemented between a position of combined drive to the accessory and to the rotor, in which the main shaft engages the drive shaft, and a position for delivering isolated drive in which this connection is interrupted so that only the accessory is driven. Gearing enables the accessory to engage a secondary shaft associated with the drive shaft of the accessory engine member.

In the present invention, such a transmission mechanism is mainly recognizable in that said gearing comprises at least one intermediate shaft interposed between the main shaft and the secondary shaft, the intermediate shaft directly engaging the main shaft. It will be understood that direct engagement of the intermediate shaft with the main shaft must be extended via a constant speed connection, i.e. one without significant variation in angular velocity, since this direct engagement is to be achieved via gearing without departing from the requirements set out above for the present invention. In addition, a secondary rotary speed differential member is interposed between the intermediate shaft and the secondary shaft, so that drive to the accessory is conserved, even in the event of any of the engine members of the rotorcraft breaking down. More precisely, these dispositions are such that the accessories are driven:

*) either by the secondary shaft on its own, itself driven by the drive shaft in the isolated drive position;
*) or else by the intermediate shaft driven by the main shaft itself driven by the rotor, whether by the engine member for driving the accessories indirectly or by the rotor itself in the event of the rotor autorotation because both of the engine members have failed.

It can be seen that regardless of the relative speeds between the secondary shaft and either the drive shaft and/or the main shaft, drive to the accessory is guaranteed, in particular regardless of the situation of the rotorcraft, whether it is preparing for flight, already flying, or waiting to fly, including in the event of one of its engine members failing in flight.

It should be observed that it is preferable for the intermediate shaft to extend parallel to the main shaft and the secondary shaft, but that is not restrictive on the scope of the present invention. It should also be observed that it is preferable to place the drive shaft on the same axis as the secondary shaft, with the main shaft being disposed coaxially about them. Under such circumstances, the main rotary speed differential member is advantageously constituted by a main freewheel interposed between the main shaft and either the secondary shaft or the drive shaft. The selective rotary drive member, in particular constituted by a positive clutch, is interposed between the main freewheel and the drive shaft and/or the secondary shaft, being movable axially by means of a rod that advantageously emerges from the end of the secondary shaft that is remote from its end abutting against the drive shaft. Nevertheless, it should be understood that these preferred dispositions are given by way of example and are not limiting in any way on the score of the present invention.

In an advantageous embodiment, the intermediate shaft is fitted with a first gear engaging a drive inlet gear fitted to the main shaft, and a second gear associated both with the secondary shaft via the secondary speed differential member and engaging with a drive outlet gear.

The secondary speed differential member is preferably constituted by a pair of secondary freewheels or the like, a first secondary freewheel being interposed between the second gear and the intermediate shaft, and a second secondary freewheel being interposed between the drive outlet gear and the secondary shaft.

BRIEF DESCRIPTION OF THE DRAWINGS

The present invention will be better understood and details concerning it appear on reading the following description of embodiments, given with reference to the figures of the accompanying sheets of drawings, in which:

FIG. 2 is a diagrammatic axial section view of a transmission mechanism constituting a second embodiment of the invention.

MORE DETAILED DESCRIPTION

Figure 1:
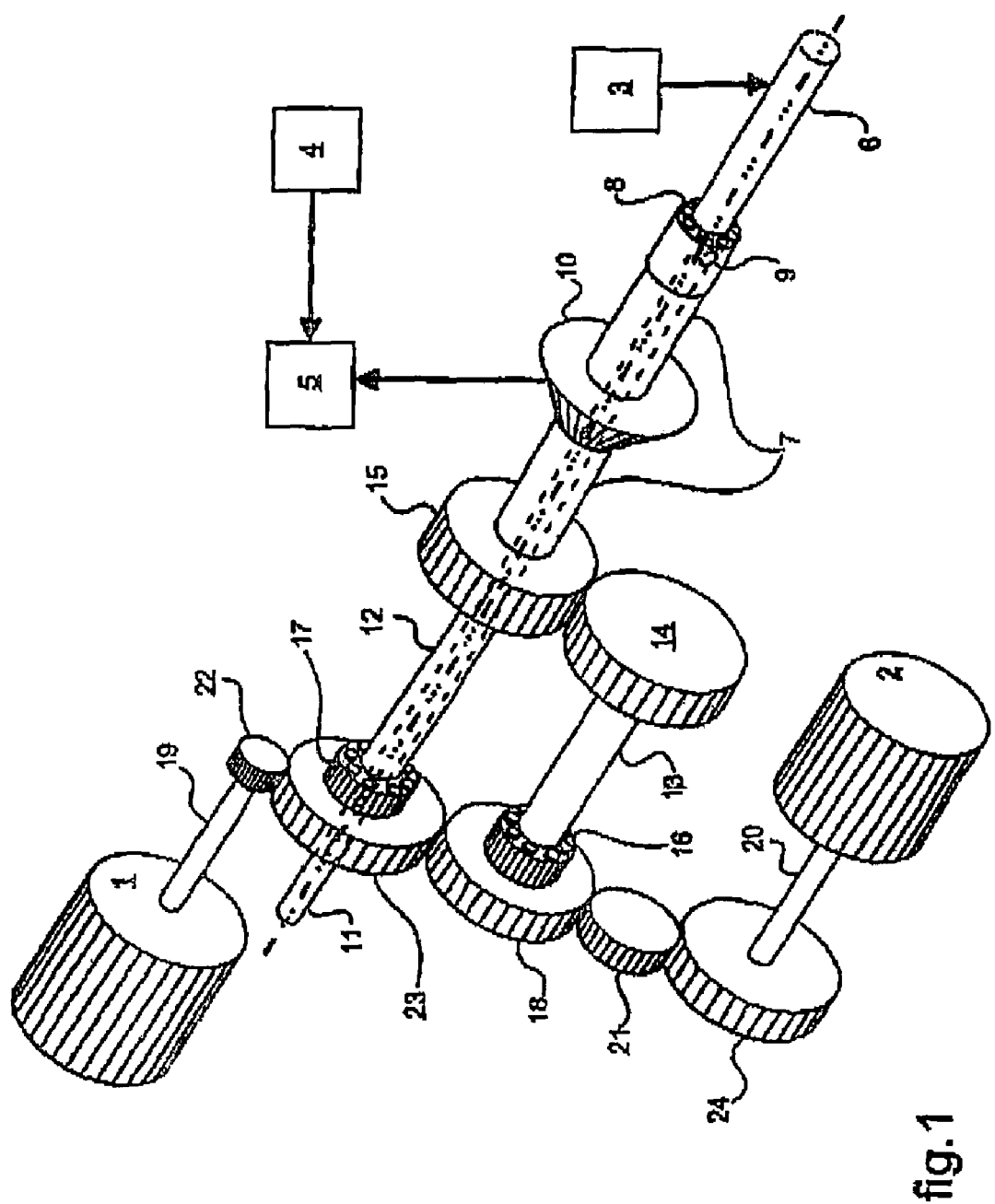
FIG. 1 is a diagrammatic perspective view of a transmission mechanism constituting a first embodiment of the invention.

In the figures, a transmission mechanism is organized to drive accessories 1 and 2 of a rotorcraft, such as an alternator 1 and a compressor 2. At this stage in the description, it should be observed that these accessories 1 and 2, and their locations in the mechanism, are mentioned and illustrated by way of example having no limitation on the scope of the present invention. These accessories 1, 2 are driven from one of the engine members 3 in a pair of engine members 3, 4 of a rotorcraft for driving the rotor 5. The transmission mechanism comprises a drive shaft 6 associated with the engine member 3 for driving the accessories 1, 2. This drive shaft 6 is associated with a main drive shaft 7 for driving the rotor 5, via a main rotary speed differential member 8 and via a member 9 for enabling the main shaft 7 to be driven selectively by the drive shaft 6.

The main shaft 7 is associated with the rotor 5 via gearing, including in particular a drive member 10 for driving the rotor 5, which member 10 is fitted on the main shaft 7 and is constituted by a conical gear or the like.

In the examples, the main shaft 7 is mounted more particularly coaxially about the drive shaft 6, the main rotary speed differential member 8 being constituted by a main freewheel interposed between them. The selective drive member 9 is interposed between the drive shaft 6 and the freewheel 8, being movable axially by a member 11 arranged as an axial rod or the like. This selective drive member 9 is constituted in particular in conventional manner in this field by a positive clutch that is movable by the axial rod 11, of conventional structure not shown.

The drive shaft 6 is also associated with a secondary shaft 12 for driving the accessories 1 and 2.

In the embodiment shown in FIG. 1, the secondary shaft 12 is more particularly coaxial on the same axis as the drive shaft 6 which it extends, and extending itself at least in part inside the main shaft 7. In addition, this secondary shaft 12 advantageously houses the axial rod 11 for moving the selective drive member 9, which emerges at its end opposite from its end extending the drive shaft 6.

In the embodiment shown in FIG. 2, the secondary shaft 12 and the axial rod 11 for moving the selective drive member 8 coincide. More precisely, the axial rod 11 itself constitutes the secondary shaft 12, being associated with the intermediate shaft 13 via the secondary rotary speed differential member 16, 17. In addition, at its distal end remote from the end used for driving it, the rod 11 has a control member 25 for driving the selective drive member 9, which co-operates in particular with the freewheel 8. By way of example, the selective drive member 9 and the freewheel 8 are organized as a rotary cage freewheel as is known in this field.

The accessories 1 and 2 are associated with the main shaft 7 via gearing including an intermediate shaft 13. The intermediate shaft 13 meshes directly with the main shaft 7 via a set of gears 14 and 15 or the like which are associated therewith. This set of gears comprises, in particular, a first gear 14 fitted to the intermediate shaft 13 which meshes with a drive gear 15 fitted on the main shaft 7. The intermediate shaft 13 is also associated with the secondary shaft 12 via a secondary rotary speed differential member 16, 17, and with an outlet drive gear 23 for driving the accessories 1 and 2.

The secondary rotary speed differential member is made up of a secondary set of freewheels 16, 17, or the like. A first secondary freewheel 16 is interposed between the intermediate shaft 13 and a second gear 18 fitted thereto (13), while a second secondary freewheel 17 is interposed between the second gear 18 and the secondary shaft 12.

In FIG. 1, the intermediate gearing between the accessories 1 and 2 and the secondary shaft 12 further comprises a first individual drive shaft 19 for driving accessories 1 and 2, which meshes with the secondary shaft 12. A second individual shaft 20 for driving accessories 1 and 2 meshes with the intermediate shaft 13. It should be observed that these connections between the accessories and the secondary shaft and the intermediate shaft, respectively, could be implemented, where appropriate, via respective interposed individual gears 21, 24, and 22, as shown.

In general terms, such an arrangement for the transmission mechanism of the present invention enables the accessories 1 and 2 to be driven not only by the engine member 3 which is directly allocated thereto, but also, in the event of the member 3 breaking down, by the other engine member 4 for driving the rotor 5, or by the rotor 5 itself if it is autorotation in the event of both of the engine members 3 and 4 of the rotorcraft failing. It should be observed that passing from one of these situations for driving the accessories 1 and 2 to another one of them can be achieved without it being necessary to interrupt the drive applied thereto, even momentarily. This possibility is achieved with only a small amount of extra size and weight, and without leading to any change in the habits involved in operating such a mechanism, in particular with respect to procedures for putting the main shaft 7 into communication with the drive shaft 6, and for putting the drive shaft 6 into communication with the secondary drive shaft 12.

More precisely, in the isolated drive position, the intermediate shaft 13 does not rotate because it meshes with the main shaft 7 via the conical gearwheel 10. It should be understood that "isolated" drive is used to mean the position in which the accessories 1 and 2 are driven while the rotor 5 is not being driven, in particular when the vehicle is waiting on the ground. The main shaft 7 is itself stationary so long as the rotor is not being driven. Such a stationary intermediate shaft 13 does not constitute an obstacle to the drive shaft 6 driving the secondary shaft 12. In this position for isolated drive, the freewheel 17 is mounted on the secondary shaft 12 in such a manner that it drives the individual gear 23. The freewheel 16 is mounted on the intermediate shaft 13 in sliding manner, so as to allow the second gear 18 to rotate, which gear meshes with the individual gear 23, while the intermediate shaft 13 is stationary, in the absence of the rotor 5 being driven.

Still more precisely, in the combined drive position, the relative speeds between the main shaft 7 and the drive shaft 6 allowing the selective drive member 8 to be moved axially by means of the rod 11, the intermediate shaft 13 and the secondary shaft 12 are driven respectively by the main shaft 7 and by the drive shaft 6. The term "combined drive" is used to designate the position in which the accessories 1 and 2 are driven simultaneously with the rotor 5, itself being driven by both of the engine members 3 and 4. In this combined drive position, the secondary shaft 12 is driven by the drive shaft 6, while the intermediate shaft 13 is driven by the rotor 5 via the main shaft 7 and the gears 14 and 15, respectively the first gear and the drive inlet gear.

This means that an appropriate choice can be found for dimensioning the transmission ratio between the drive inlet gear 15 and the first gear 14, and also between the drive outlet gear 23 and the second gear 18. Given the different inertias of the rotary members involved, in particular the difference between the inertia of the rotor and the inertia of the accessories, and given possible constraints concerning minimum and maximum operating thresholds for at least one of the accessories, it is desirable for the result of the multiplication performed by the above-mentioned gear ratios to be approximately unity, being slightly greater than 1.

More precisely, and in another aspect of the present invention, the ratio between the drive inlet gear 15 and the first gear 14, and the ratio between the drive outlet gear 23 and the second gear 18 satisfy the rule whereby $(Z15/Z14) \times (Z23/Z18)$ is slightly greater than 1, in which;

Z15 is the number of teeth on the drive inlet gear;

Z14 is the number of teeth on the first gear;

Z23 is the number of teeth on the drive outlet gear; and

Z18 is the number of teeth on the second gear.

These dispositions are such that for implementing such a transmission mechanism, passing between the isolated drive position and the combined drive position, and vice versa, is performed with a small rotary speed differential between the speeds of the drive shaft 6 and the main shaft 7. This small speed differential is obtained in particular by a slight decrease in the speed of operation of the engine member 3 that is allocated to driving the accessories directly, compared with the speed of operation of the engine member 4 that acts indirectly on the accessories 1, 2 via the rotor 5. These dispositions make it easy to move the selective drive member 9.

It should be observed that passing between the isolated drive position and the combined drive position, and vice versa, can be undertaken without interrupting drive to the accessories 1 and 2, and that nevertheless, in the event of an interruption in the drive to the secondary shaft 12 from the drive shaft 6, the gear 23 can continue to be driven via the intermediate shaft 13 and the main shaft 7 as driven by the rotor 5, itself being driven either by the engine member 4 that is not directly associated with the accessories, or else by the rotor autorotation in the event of the engine 3 breaking down. It should also be observed that these dispositions are such that it is easier to move the selective drive member 8 axially by using the rod 11 by making use of the relative speeds of rotation of the various shafts 6, 7, 12, and 13 that are caused progressively to match.

More precisely, on passing from the isolated drive position to the combined drive position, the selective drive member 9 is moved at a small speed differential so as to avoid any danger of breaking the members involved. When both of the engine members 3 and 4 are stopped, moving the selective drive member 9 can be achieved directly, in particular by acting on the rod 11. This applies when the member 3 for driving the accessories 1 and 2 is in operation, with its speed of operation being diminished progressively. As a result, the small speed differential between the drive shaft 6 and the main shaft 7 allows the selective drive member 9 to be moved without any risk of damage.

Still more precisely, when going from the combined drive position to the isolated drive position, the speed of the engine member 3 for driving the accessories 1 and 2 is decreased slightly so as to allow the selective drive member 9 to be moved in the opposite direction.

Nevertheless, it will be understood that, without going away from the above-specified rules, the invention seeks to make it possible to change drive to the accessories 1 and 2 on the basis of a small variation in the speeds of the engine members 3 and 4 relative to each other, with it nevertheless being preferred to decrease the speed of the engine member 3 for directly driving the accessories 1 and 2.

In the event of the engine member 3 for directly driving the accessories 1 and 2 breaking down, the drive outlet gear 23 is nevertheless rotated by the intermediate shaft 13, meshing with the main shaft 7, itself driven by the rotation of the rotor 5. This drive is obtained more particularly by the successive connection between the main shaft 7 and the drive inlet gear 15 fitted thereon, with the first individual gear 14 and thus the intermediate shaft 13 carrying it, and then with the second gear 18 and the drive outlet gear 23 via the second rotary differential member 16 and 17, constituted in particular by a set of freewheels using flyweights or the like, for example.

It should be observed that the transmission device of the present invention is connected to single gear 10 for driving the rotor 5, in spite of the presence of a plurality of engine members 3 and 4 used for driving the rotor. It can be seen that the transmission device of the present invention can be installed on one of the sides of the vehicle, obtaining the advantages associated therewith relating in particular to compactness and to simplicity of structure.

What is claimed is:

1. A transmission mechanism between at least one accessory (1, 2) and engine members (3, 4) for driving a rotor (5) of the rotorcraft, the first engine member (3) being allocated for driving the accessory either in isolation or else together with the rotor, and a second engine member (4) being provided for driving only the rotor, the mechanism comprising a main shaft (7) provided with a rotor drive member (10), the main shaft being associated with a drive shaft (6) engaged with the first engine member via a main rotary speed differential member (8) and a selective rotary drive member (9), the selective rotary drive member being movable between a position for combined drive of the accessory and the rotor in which the main shaft engages the drive shaft, and an isolated drive position in which the main shaft does not engage the drive shaft so as to drive the accessory alone, the accessory being engaged via gearing with a secondary shaft (12) associated with the drive shaft of the first engine member, in which said gearing comprises at least one intermediate shaft (13) interposed between the main shaft and the secondary shaft, the intermediate shaft directly engaging the main shaft and engaging the secondary shaft, a second rotary speed differential member (16, 17) being interposed between the secondary shaft and the intermediate shaft to enable the accessory to be driven either by the secondary shaft alone, being driven by the drive shaft in the isolated drive position, or by the intermediate shaft driven by the main shaft, and in which the main shaft is mounted on the same axis as the drive shaft, the selective drive member being interposed between the drive shaft and the main rotary speed differential member, the mechanism including an axial rod (11) for moving the selective drive member.

2. A mechanism according to claim 1, in which the intermediate shaft is fitted with a first gear (14) engaged with a drive inlet gear (15) fitted on the main shaft, and with a second gear (18) engaging firstly with the secondary shaft via the secondary speed differential member, and secondly engaging a drive outlet gear (23) for driving the accessory.

3. A mechanism according to claim 2, in which the secondary speed differential member comprises a pair of secondary freewheels comprising a first secondary freewheel interposed between the second gear and the intermediate shaft, and a second secondary freewheel interposed between the outlet drive gear and the secondary shaft.

4. A mechanism according to claim 2, in which the ratio between the drive inlet gear and the first gear, and the ratio between the drive outlet gear and the second gear satisfy the following inequality $[(Z15/Z14) \times (Z23/Z18)] > 1$, in which:

$Z15$ is the number of teeth on the drive inlet gear;
$Z14$ is the number of teeth on the first gear;
$Z23$ is the number of teeth on the drive outlet gear; and
$Z18$ is the number of teeth on the second gear.

5. A mechanism according to claim 1, in which the main shaft is mounted coaxially around the drive shaft, the main rotary speed differential member being constituted essentially by a main freewheel interposed between them.

6. A mechanism according to claim 1, in which the secondary shaft lies on the same axis as the drive shaft which it extends, the drive shaft extending at least in part inside the main shaft and receiving the rod which emerges at its end opposite from its end extending the drive shaft.

7. A mechanism according to claim 1, in which the secondary shaft and the rod for moving the selective drive member coincide, the rod being associated with the intermediate shaft via the secondary rotary speed differential member and having, at its distal end opposite from its end used for moving it, a control member (25) for moving the selective drive member.

8. A mechanism according to claim 1, in which a first individual shaft (19) for driving the accessory is engaged on the secondary shaft while a second individual shaft (20) for driving the accessory is engaged on the intermediate shaft.

9. A method for implementing the mechanism according to claim 4, in which passage between the isolated drive position and the combined drive position is performed with a rotary speed differential between the speed of the drive shaft and the speed of the main shaft.

10. A method of implementing the mechanism according to claim 4, in which the passage between the isolated drive position and the combined drive position is performed by reducing the operating speed of the first engine member relative to the operating speed of the second engine member in order to make it easier to move the selective drive member.

* * * * *